United States Patent [19]

Clark et al.

[11] 3,999,869
[45] Dec. 28, 1976

[54] COMBINATION HOLE SAW ARBOR

[75] Inventors: Calvin M. Clark, Bernardston, Mass.; Americo P. D'Attilio, East Hartford, Conn.

[73] Assignee: Stanadyne, Inc., Hartford, Conn.

[22] Filed: Nov. 6, 1975

[21] Appl. No.: 629,388

[52] U.S. Cl. .................................. 403/3; 144/23; 279/7; 408/226; 408/204
[51] Int. Cl.² ..................... F16D 1/06; B23B 31/44
[58] Field of Search ........... 408/226, 204; 279/1 A, 279/1 R, 9 R, 9 A, 83, 7; 144/23; 403/3, 4, 383

[56] References Cited
UNITED STATES PATENTS

| | | | |
|---|---|---|---|
| 1,209,362 | 12/1916 | Turner | 279/1 A |
| 3,609,056 | 9/1971 | Hougen | 408/204 X |
| 3,647,310 | 3/1972 | Morse | 279/1 A X |

*Primary Examiner*—Othell M. Simpson
*Assistant Examiner*—Horace M. Culver
*Attorney, Agent, or Firm*—Prutzman, Hayes, Kalb & Chilton

[57] ABSTRACT

An arbor is provided for use with different size power tool chuck jaws and has a main body section of enlarged cross section relative to a shank of the arbor. The shank and main body section have a plurality of grooves therein with each groove longitudinally extending the length of the shank and into the adjoining main body section to define a continuous chuck jaw engaging surface which in the main body section of the arbor is of enlarged circumferential dimension relative to that of the shank drive surface for engaging different size chuck jaws in non-slipping positive driving relation.

3 Claims, 3 Drawing Figures

COMBINATION HOLE SAW ARBOR

This invention generally relates to power tool drive arbors and particularly concerns a combination drive arbor for hole saws and the like.

A principal object of this invention is to provide a new and improved combination arbor which is particularly designed to be used with different size chuck jaws of power tools such as conventional electric drills.

Another object of this invention is to provide such an arbor which is capable of withstanding high torque demands without slippage in a compact rugged construction suited to provide reliable service over an extended period of time and which is quickly and easily manufactured at significant cost savings.

Other objects will be in part obvious and in part pointed out more in detail hereinafter.

A better understanding of this invention will be obtained from the following detailed description and the accompanying drawing of an illustrative application of the invention.

Figure 1:
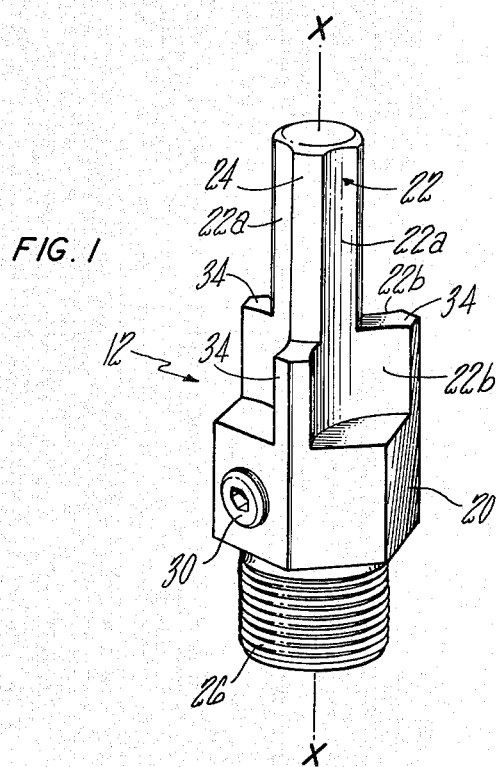
FIG. 1 is an isometric view showing an arbor incorporating this invention.

Referring to the drawing in detail, drive arbors of a type contemplated in this invention are generally driven by a portable power unit, e.g., a conventional electric drill equipped with a so-called "Jacobs" three jaw chuck. A typical application of such a drive arbor would be, e.g., a hole saw such as shown at 10 in FIG. 2 which is mounted on an arbor 12 received within chuck 14. The chuck 14 is of a type having three angularly spaced jaws such as at 16 mounted in a nose piece 18 on a drive output end of a power unit, not shown, which will be understood to be a conventional electric drill.

To effect low cost manufacture of a drive arbor unit which is designed to be used with three jaw chucks of different size, and at the same time provide a compact rugged structure particularly adapted for different working loads under demanding conditions, arbor 12 is shown as having a main body section 20 formed from commercially available ⅝ inch hex stock with one end turned to form a reduced shank and milled axial grooves 22 are formed to longitudinally extend the length of shank 24 and into the main body section 20 of arbor 12.

Arbor 12 is conveniently provided with a bore, not shown, axially formed in its threaded terminal section 26, which is opposite shank 24, for receiving a suitable pilot drill 28 conventionally secured within the bore by a set screw 30 threadably mounted in the main body section 20 of arbor 12. The threaded terminal section 26 is specifically designed to permit hole saw 10 to be mounted by rotating its internally threaded hub, not shown, on base 32 of hole saw 10 onto threaded section 26 such that hole saw 10 and drive arbor 12 are drivingly coupled for simultaneous rotation in unison with one another.

More specifically, grooves 22 are conveniently formed 120° apart in the milling operation which forms axially extending cylindrical cutouts along arbor 12 to provide a concave arcuate drive surface along the extent of each groove 22. Accordingly, it will be seen that the arbor 12 may be economically manufactured from a single piece of readily available stock. The three milled grooves are easily formed in equal circumferentially spaced relation along the full length of the shank and extend a substantial distance into the main body section 20, which in FIG. 1 is shown as being almost half way along the length of section 20. The grooves 22 are shown as of equal axial length and terminating in a common plane intermediate arbor section 20, which plane extends at right angles to the main arbor axis X—X.

As noted, the main body section 20 of arbor 12 is of enlarged cross section relative to that of shank 24, with the shank 24, main body section 20 and threaded terminal section 26 being in concentric relation to one another. Accordingly, the circumferential dimension of each groove 22 differs in main body section 20 and shank 24 in corresponding relation to the difference in the cross sectional sizes of main body section 20 and the adjoining shank 24.

By virtue of the above described construction of arbor 12, groove drive surfaces 22a and 22b are formed respectively in shank 24 and in main body section 20 to serve as drive surfaces particularly suited to be used with different size power tool chuck jaws.

Figure 2:
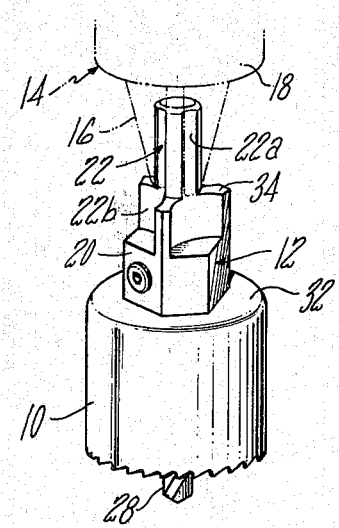
FIG. 2 is an isometric view, shown on a reduced scale and partly broken away, of an assembly utilizing the arbor of FIG. 1 in one mode of operation.

Shank 24 of arbor 12 is turned to fit, e.g., a ¼ inch drill chuck and, as best seen in FIG. 2, shank 24 may be received in and gripped in driving relation by chuck 14, which as noted could typically be an ¼ inch capacity chuck. Jaws 16 are positively gripped on drive surfaces 22a formed by each of grooves 22 in shank 24 whereby the positive drive connection is effected to power operate hole saw 10.

Figure 3:
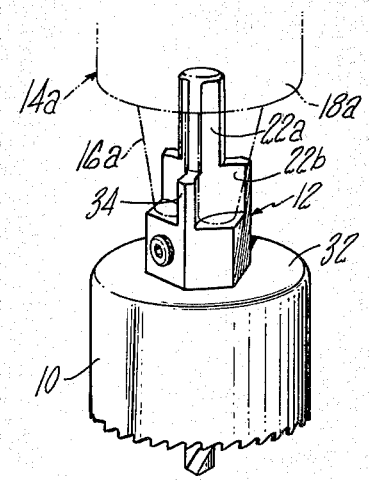
FIG. 3 is a view similar to FIG. 2 but showing the arbor in assembly in another mode of operation.

In FIG. 3, the shank 24 of arbor 12 is shown gripped by chuck jaws 16a which engage not only the drive surfaces 22a of each groove 22 but also extend between body webs 34 to grip the enlarged drive surfaces 22b of the main body section 20 of arbor 12. Accordingly, it will be seen that a ⅜ inch or ½ inch chuck such as 14a in FIG. 3 of a larger capacity electric drill provides jaws 16a which not only grip surfaces 22a but also the drive surfaces 22b between webs 34 which are designed to withstand demanding torque loads during heavy cutting conditions.

It will be seen that arbor 12 of this invention can be used in electric drills with ¼ inch, ⅜ inch and ½ inch capacity chucks, e.g., and will be used for driving a variety of different size hole saws, such as 9/16 inch to, say, 1⅛ inch hole saws for different cutting applications in various materials such as plastic, wood and metal. While the arbor 12 of this invention indeed provides chuck jaw engaging drive surfaces of different size for different electric drills, in each case the arbor when assembled in either mode of operation as illustrated in FIGS. 2 and 3, serves to provide a positive drive arrangement and obviates normal problems of slippage so frequently encountered when a shank of the arbor gripped by the chuck is of a cylindrical configuration. Moreover, the arbor 12 will be seen to be quick and easy to manufacture and assemble to achieve the desired cost savings.

As will be apparent to persons skilled in the art, various modifications, adaptations and variations of the foregoing specific disclosure can be made without departing from the teachings of this invention.

We claim:

1. For the use with different size power tool chuck jaws, a combination arbor comprising an elongated body having a shank and adjoining main body section of enlarged cross section relative to the shank, and a plurality of longitudinally extending grooves formed in the body in equally spaced circumferential relation to one another, the grooves each extending continuously from the shank into the adjoining enlarged main body section of the arbor, each groove forming an uninterrupted, arcuate chuck jaw engaging drive surface continuously extending from the shank into the adjoining enlarged main body section of the arbor, the drive surface of each groove in the shank and adjoining enlarged main body section having different arcuate dimensions corresponding to the different cross sectional sizes of the shank and adjoining main body section of the arbor for respectively engaging relatively small and relatively large size power tool chuck jaws.

2. The combination arbor of claim 1 wherein the shank and main body section of the arbor are in cocentric relation to one another.

3. For use with different size power tool chuck jaws, a combination arbor comprising an elongated body having a shank and adjoining main body section of enlarged cross section relative to the shank, and three longitudinally extending grooves formed in the body in equally spaced circumferential relation to one another and extending continuously along the full length of the shank and into the adjoining main body section of the arbor, the grooves being of equal axial length and coterminous in a plane extending at right angles to the main arbor axis intermediate the main body section of the arbor, each groove forming an uninterrupted chuck jaw engaging drive surface for engaging chuck jaws of larger size in the main body section of the arbor and smaller size chuck jaws in the shank of the arbor.

* * * * *